Figure 5:
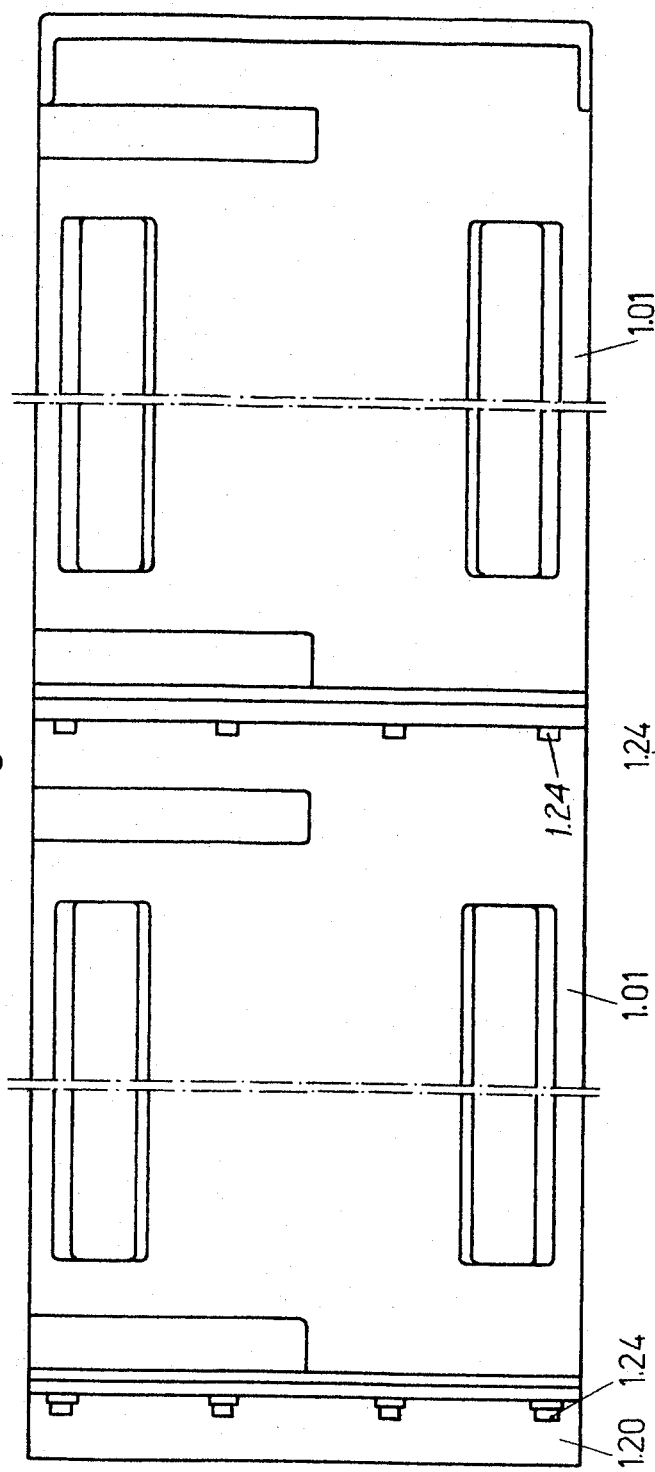

United States Patent [19]
Klein

[11] 3,846,678
[45] Nov. 5, 1974

[54] MULTI-CELLED MOUNTING FRAME FOR STATIC CONVERTER MODULES

[75] Inventor: Erwin Klein, Heddesheim, Germany

[73] Assignee: BBC Aktiengesellschaft Brown, Boveri & Cie, Baden, Switzerland

[22] Filed: Dec. 14, 1971

[21] Appl. No.: 207,842

[30] Foreign Application Priority Data
Dec. 19, 1970 Germany.......................... 2062666

[52] U.S. Cl. .......... 317/120, 317/101 CB, 317/100, 312/107, 174/15 R
[51] Int. Cl. ............................................. H05k 7/18
[58] Field of Search........... 179/15 R, 16 R; 317/99, 317/101 CB, 100, 120, 101 R, 101 DH; 312/107, 198, 199, 223

[56] References Cited
UNITED STATES PATENTS

| | | | |
|---|---|---|---|
| 2,942,856 | 6/1960 | Woodward.......................... | 317/100 |
| 3,124,720 | 3/1964 | Green .............................. | 174/15 R |
| 3,209,208 | 9/1965 | Francis............................. | 317/100 |
| 3,586,917 | 6/1971 | Oates................................ | 174/15 R |
| 3,619,473 | 11/1971 | Meyerhoff......................... | 174/15 R |
| 3,648,113 | 3/1972 | Rathjen............................. | 174/15 R |

*Primary Examiner*—Robert K. Schaefer
*Assistant Examiner*—Gerald P. Tolin
*Attorney, Agent, or Firm*—Pierce, Scheffler & Parker

[57] ABSTRACT

A multi-celled mounting frame for receiving static converter modules particularly for installation in traction vehicles driven by electric motors or internal combustion engines comprises an assembly of stacked and interconnected cells having a rectangular configuration each of which includes ribs along opposite side walls thereof that are provided with through-bores for receiving fastening bolts. The ribs extend for one-half the height of the side wall, the ribs on one side extending from the top down to the middle and the ribs on the opposite side extending from the bottom up to the middle. This permits the cells to be joined together in a side-by-side arrangement and/or in a superposed relation by the fastening bolts inserted through the bores in the aligned ribs of the adjacent casings.

8 Claims, 13 Drawing Figures

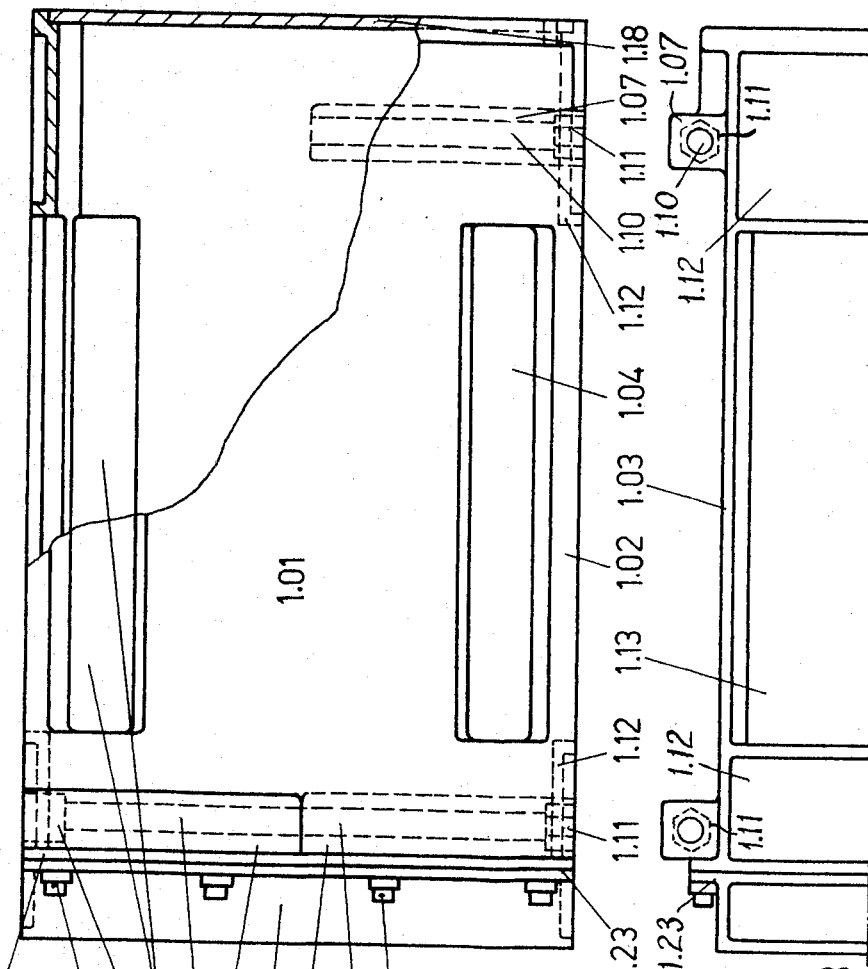
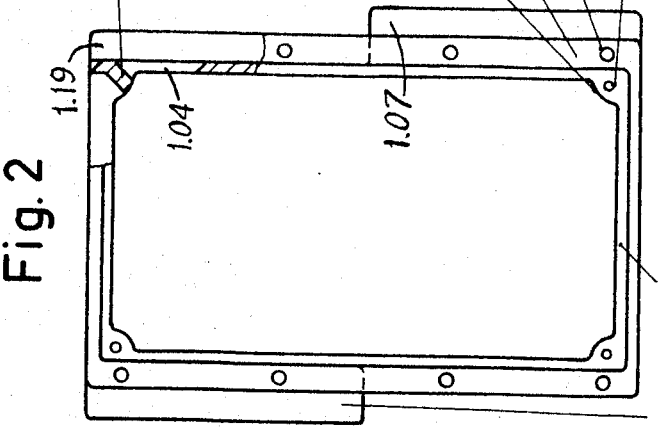
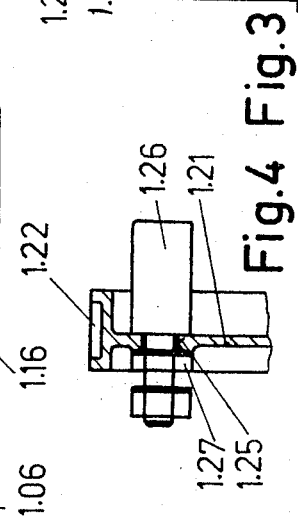

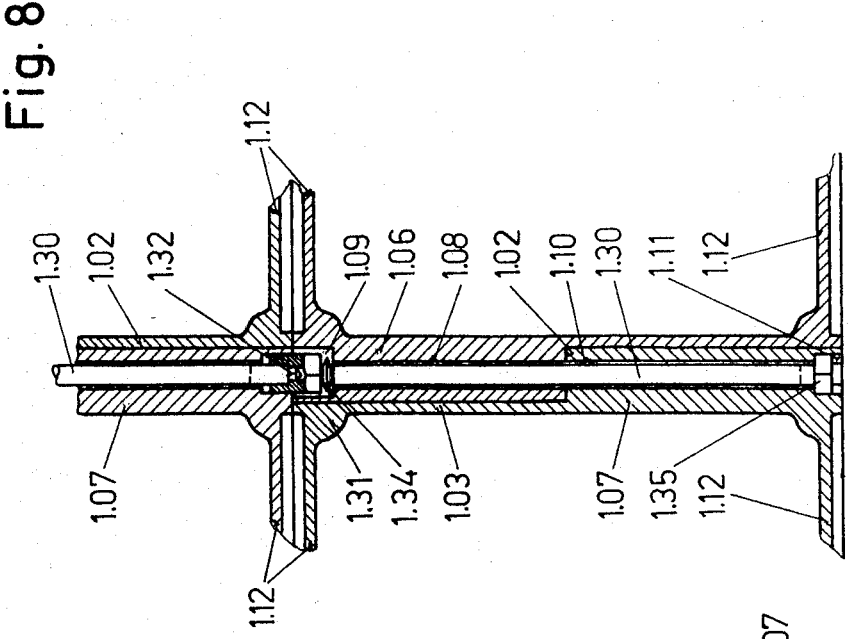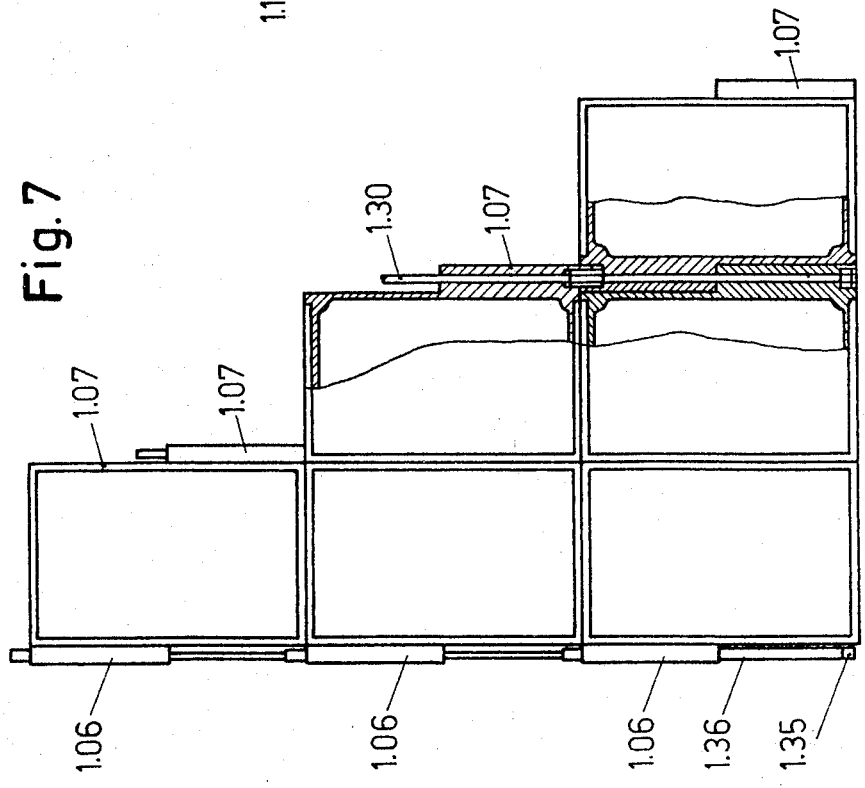

3,846,678

MULTI-CELLED MOUNTING FRAME FOR STATIC CONVERTER MODULES

This invention relates to a static converter system, in particular for incorporation into traction vehicles which are driven by electric motors or internal combustion engines, and built-up from a plurality of static converter modules, adapted for sliding into retaining means and comprising the static converter element, heat sink and circuit accessories.

Stationary or mobile static converter systems in which electrical energy of a defined voltage and frequency is converted into energy of a different voltage and frequency by means of a substantial number of partially serially and parallel connected semiconductor elements, are usually constructed in the form of cubicles or frame. In order to reduce construction work and to increase the number of identical components which are to be produced, it is the practice to combine the diode or the thyristor, the heat sink, the RC network and a fuse and, if thyristors are employed, an additional pulse transformer, to form one module. Monitoring means with indicating facilities are also often provided. A plurality of such modules is then combined on the power current and/or control current side to form appropriate systems (see BBC Nachrichten 1961, page 674, also Thyristor-Handbuch by Dr. Hoffmann and Stucker, Berlin 1965, page 379, et seq.).

The modules mentioned hereinbefore are constructed so that they can be slid into a frame. Defects may thus be easily remedied by exchanging the modules. The electric power current or control current connections are provided in screw-mounted or plug-in form. Mechanical mounting may take different forms. It was possible to achieve a substantial rationalization effect by employing such semiconductor modules. However, it was necessary to continue to construct the frame, which may be very comprehensive, afresh for each individual case.

A further step towards cost-saving was achieved by forming racks from decks whose width could be varied by connecting members of different length and which could be stacked vertically, the semiconductor modules being individually insertable into such frames. The use of such "standard frames" however is impossible or modifications thereof are required if the space available for installation is very confined as is usually the case in rail vehicles. Frequently, only very small front surfaces are available in such vehicles so that it is not possible for the required number of semiconductor modules to be accommodated. The required front surface can be reduced by disposing two individual modules serially in the plug-in direction, that is to say by providing a double module. However, this does not solve the problem of constructing the frames in adaptable form.

It is the object of the invention to provide a static converter system with an improved, multi-celled mounting frame into which single semiconductor modules as well as double semiconductor modules may be inserted and which may be adapted to widely different apparatus dimensions. A further object of the invention is to arrange for the cooling air to be ducted so that all heat sinks of the static converter modules are cooled with equal facility. It is known that the current carrying capacity of semiconductor modules depends principally on the limiting temperature of the silicon disc and this in turn depends on good heat transfer to the heat sink and good heat dissipation from the said heat sink. The load-carrying capacity of the semiconductor elements disposed downstream of the air stream is greatly reduced if the heat sinks are serially disposed in terms of cooling air flow. A long row of semiconductor modules, disposed serially by reference to the cooling air, is subject to substantial load reductions.

In accordance with the invention, the improved mounting frame comprises an assembly of stacked and interconnected rectangular cells each of which is adapted to receive a converter module of the plug-in type, each cell including parallel spaced side walls, top and bottom walls and a rear wall. The side walls include ribs provided with through-bores for receiving fastening screw bolts and the ribs extend for a maximum of one-half the height of the side walls, the ribs on one side wall extending from the top down and the ribs on the opposite side wall extending from the bottom up. This permits the cells to be joined together in a side-by-side arrangement and/or in a superposed relation by the fastening bolts inserted through the bores in the aligned ribs of adjacent cells. The rear wall is adapted for accommodating plug or screw connections for the power current and control current conductors of the static converter module.

In a further embodiment of the invention the ribs of one cell side wall extend from the middle of the cell to the upper end and the ribs of the other cell side wall extend from the middle to the lower end thereof.

In a preferred embodiment of the invention the screw bolts for joining adjacent cells are inserted into hexagon nuts which are placed in hexagon recesses of the lower parts of the ribs to prevent the nuts from turning.

According to a further feature of the invention cavities disposed between inward facing side walls of the cell and between two sets of ribs between two cells, function as air ducts through which cooling air flow may be supplied to the individual modules.

According to a further feature of the invention the lower part of the side walls of the cells is provided with frangible apertures through which communication may be established between the air ducts and the interior of the casing and through which a stream of cooling air may be supplied into or discharged from the casing.

Finally, according to a further feature of the invention the electric power current connections are provided directly at the positions at which the plug connections, provided on the rear wall of the individual cells, are brought out.

Figure 6:
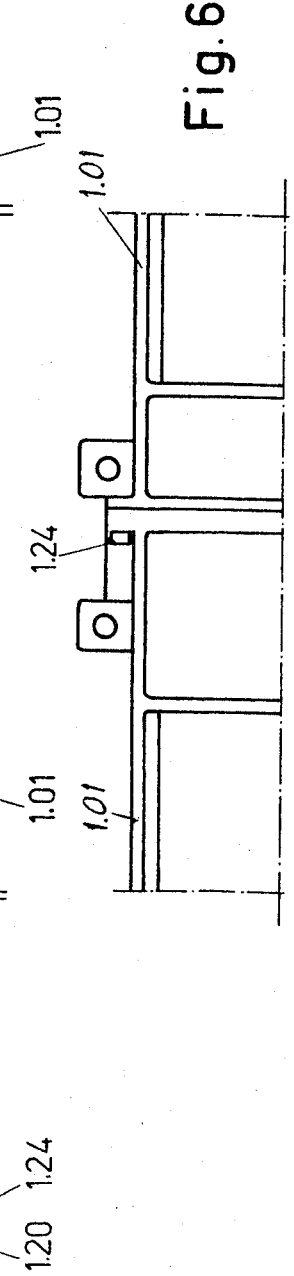
Figures 9, 10:
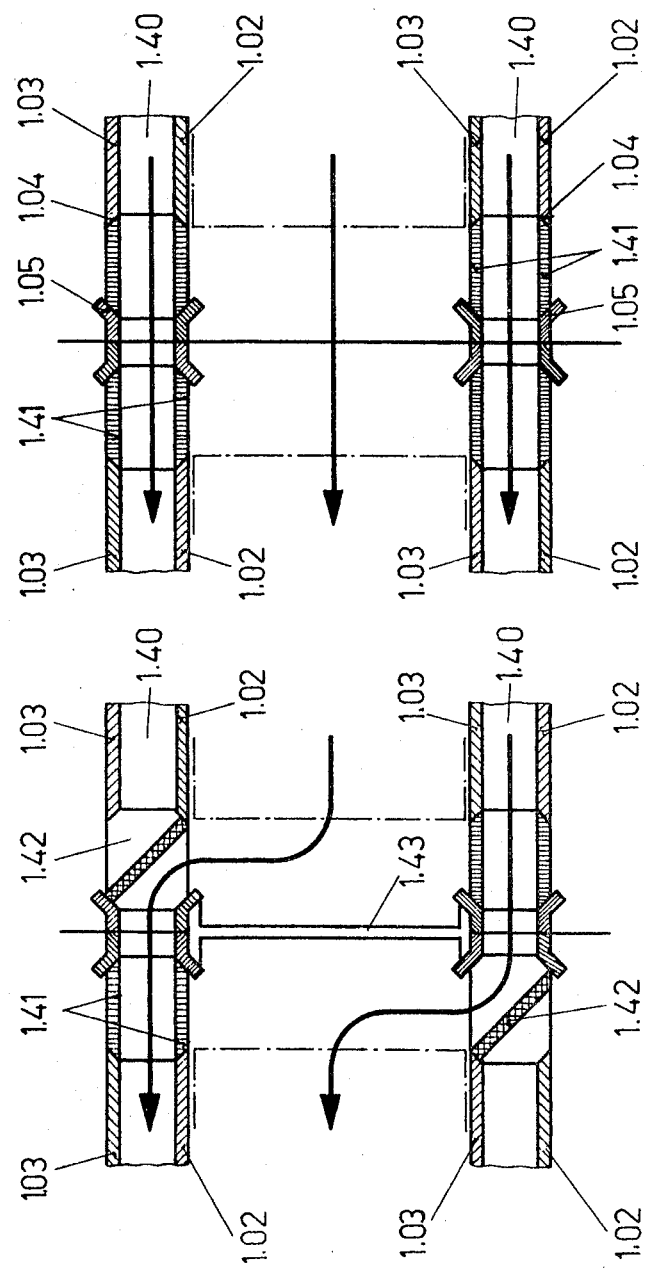
Figures 11, 12:
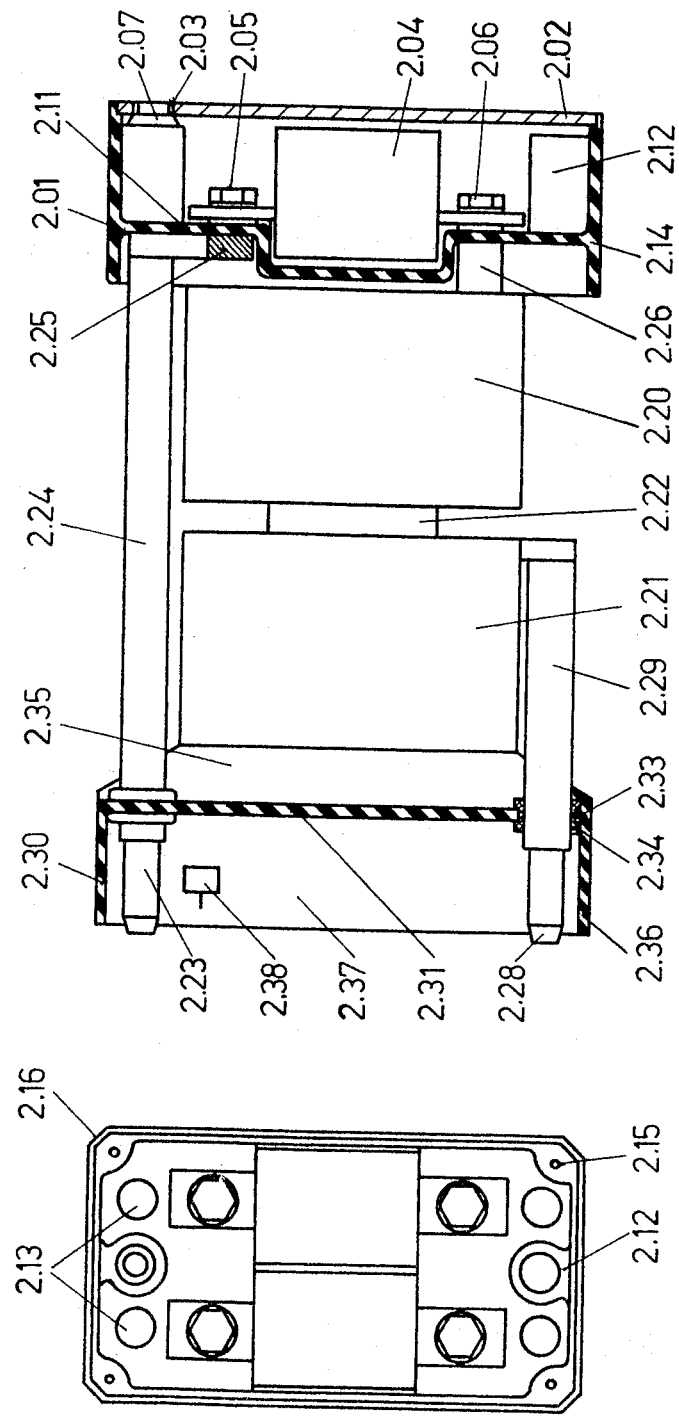
Figure 13:
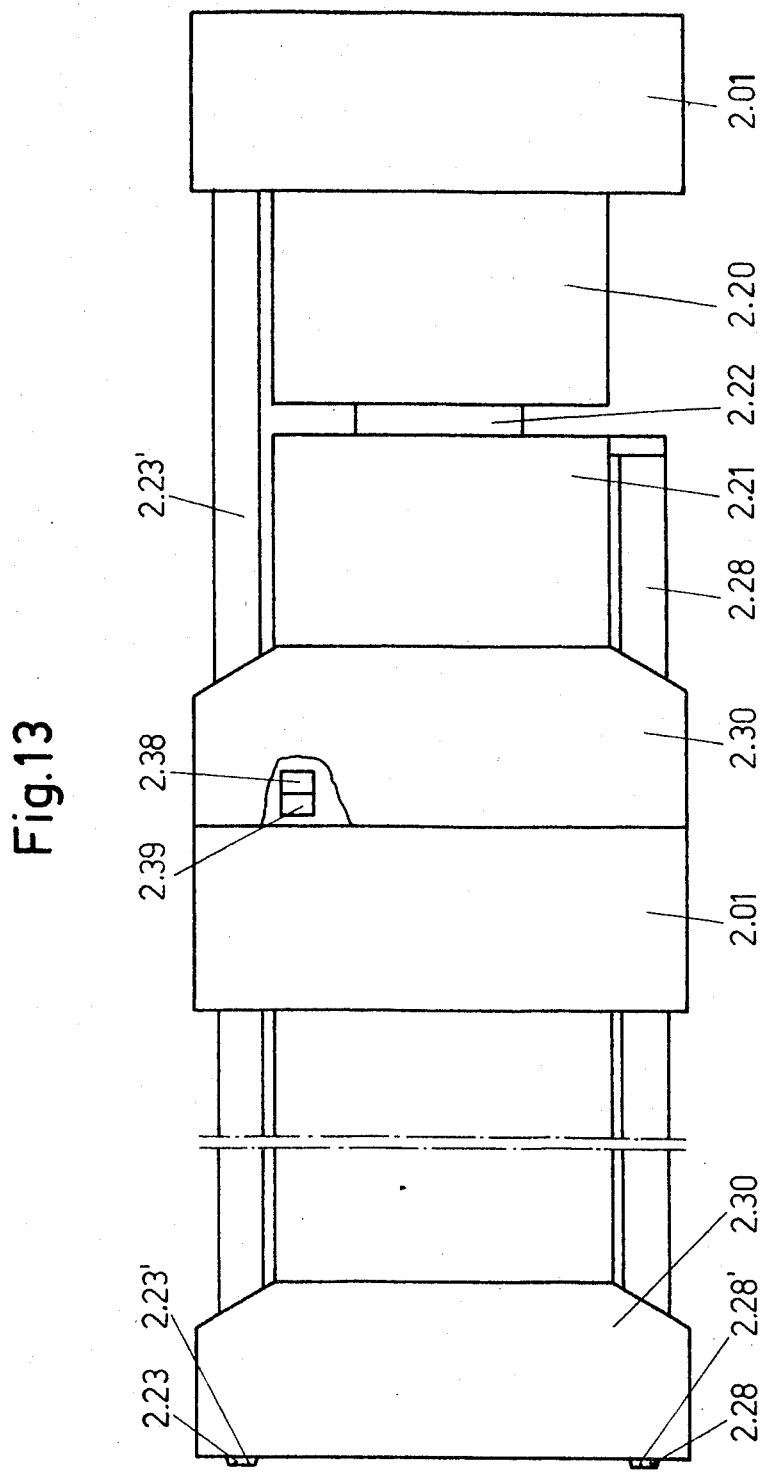

Further details and advantageous further embodiments of the invention are dislosed in the embodiments described hereinbelow and illustrated in the accompanying drawings in which FIGS. 1 to 4 show the construction of one cell for accommodating a single static converter module, FIGS. 5 and 6 show the construction of a cell for accomodating a double static converter module, FIGS. 7 and 8 show a typical configuration for a mounting frame assembled from a plurality of cells, FIGS. 9 and 10 show a section of a cell with the supply of cooling air drawn therein, FIGS. 11 and 12 show the construction for a typical single static converter module designed as a plug-in unit when inserted into its cell, and FIG. 13 shows a double static converter module formed from two single static converter modules.

A side view of a cell for a single module is shown in FIG. 1. FIG. 2 is a view of the front end into which the converter module is inserted. FIG. 3 is a part of a top plan view and FIG. 4 is a section of the rear wall of the cell. All reference symbols for parts of the cell begin with the numeral 1. The cell, constructed of plastics is designated with the numeral 1.01. It comprises two side walls 1.02 and 1.03, each being inserted into two identical recesses 1.04 and defined at the top and bottom respectively by stiffenings 1.05. The module described hereinbelow is guided in said side walls on being inserted. Two ribs 1.06 and 1.07 of equal height are mounted on each side wall 1.02 and 1.03 respectively, the said ribs extending on the left wall from the down to the bottom up to the middle and on the right wall from the middle. The ribs 1.06 are provided with round bores 1.08 and 1.09, the ribs 1.07 being provided with round bores 1.10 and a separate hexagon recess 1.11. The top and bottom walls of the cell are identically constructed and are designated with the numeral 1.12. The top and bottom walls are provided with cut-outs apertures 1.13.

On the front end, the cell 1.01 is provided with side flanges 1.14 which have apertures 1.15. A fold 1.16 with apertures 1.17 is also provided for receiving and mounting of a cover plate 1.18. On the rear end the cell is also provided with side flanges 1.19, having tapped holes which are not shown. At this position a rear wall 1.20 is screw-mounted on to the cell structure 1.01. The rear wall includes a plate portion 1.21 bounded by a collar 1.22. Flanges 1.23 extend on the side beyond the collar 1.22. The rear wall is joined through the aforementioned flanges by screw fasteners 1.24 to the side flanges 1.19 of the cell 1.01. Two apertures 1.25, having the same position as the plug pins of the converter module, are disposed in the plate 1.21. They are provided for mounting two contact sockets 1.26, retained by screw fastenings 1.27 which pass through the apertures 1.25. The associated socket strip is not shown. It is coupled to the plug strip 2.38 of the module (shown in FIG. 12). When the converter module, shown in FIGS. 11 and 12 is inserted into the cell 1.01 the plugs 2.23 and 2.28 are pushed into the sockets 1.26.

A side view of a double cell, comprising two cells 1.01 and a bottom 1.20, formed by screw fastening means is shown in FIG. 5, FIG. 6 showing a plan view. In this case, four contact sockets 1.26 are provided instead of two of such contact sockets.

FIG. 7 illustrates the manner of assembling a mounting frame from the individual cells. The position at which the individual cells are joined is shown in FIG. 8 to an enlarged scale. To construct the mounting frame, the appropriate number of cells is first placed adjacently so that the ribs 1.06 or 1.07 of the cells to be joined to each other are in alignment. Special screw bolts 1.30 with a head 1.31 and spring washers 1.34 are then inserted from above through the bores 1.08 and 1.10 of the ribs 1.06 or 1.07 respectively. The said screw bolts are screwed into nuts 1.35 which are inserted into the hexagon recesses 1.11. The spring washers 1.34 enable the screw head 1.31 to be moved into the position which will secure the screw bolt 1.30 after the next row of cells is fitted. Since the head 1.31 is provided with a screw thread 1.32 it is possible for the fastening bolts 1.30 to be screwed in from above. Spacer tubes 1.36 are provided in place of the ribs which are omitted from the cells disposed on the left hand, outer bottom side.

The screw bolt fastening connection of the cells described hereinabove enables the mounting frame to be suspended by screw fastening means during transportation, a function which the cells, constructed of plastics for reasons of electrical insulation, could not perform owing to the large weight of a frame fitted with modules. If necessary, a fan for forced cooling may be mounted on the aforementioned screw fastening connections.

FIGS. 9 and 10, illustrating sections through cells disposed superjacently and adjacently illustrate the manner in which cooling air is ducted. In the schematic diagram of FIG. 9 three streams of cooling air flow in parallel, two such streams flowing through the cavities 1.40 between the cells and one stream flowing through the cells thus cooling the heat sinks 2.20 and 2.21 of the modules. To prevent intermixing of the three air streams the apertures 1.04 of the walls 1.02 and 1.03 are closed by means of frames 1.41 inserted during assembly.

FIG. 10 shows the manner in which a stream of cooling air, heated by the heat sinks, is discharged from one cell and a stream of fresh air is introduced from the gap 1.40 into the lower cell. In this embodiment frames 1.42 are inserted in addition to frame 1.41 during assembly. Discharge of the heated cooling air into the lower cell is prevented by a bottom member 1.43.

In FIGS. 11 and 12 the numeral 2.01 refers to an insulating box (see right-hand side of the illustration) for an individual module which may be closed by means of a lid 2.02 which may be provided with up to two apertures 2.03. One or two electric fusible cut-outs 2.04, connected into the electric circuit by screw fastening means 2.05 and 2.06 are accommodated into the space thus produced. The bottom 2.11 of the box 2.01 is provided with two apertures 2.12 on which illuminated signalling means 2.07 are mounted for indicating fuse defects. The apertures 2.13 on the floor 2.11 are provided for the lead-throughs of power current connections, in this case plug pins, and of mechanical mounting elements which are not shown. The wall 2.14 of the insulating box 2.01 is provided in the corners with four apertures 2.15 in which the lid 2.02 is mounted by means of quick-acting fasteners which are not shown. The four corners 2.16 of the housing wall 2.14 are chamfered. The module is guided by the said chamfers on being inserted into the cell 1.01. A combination of two heat sinks 2.20 and 2.21 with a thyristor or diode 2.22 in disc form is mounted on the insulating box 2.01. When using thyristors or diodes of flat bottom cell construction or screw stud cell construction, the heat sinks will be adapted to the shape of the semiconductor elements.

A further insulating box 2.30, supporting the plug pins for the power current paths and plug pins for the control conductors is screw-mounted on the second heat sink. The power current path extends through the plug pin 2.23, insulated by means of a tube 2.24, a bridge 2.25, the screwing means 2.05, the fusible cut-outs 2.04, the screwing means 2.06 and the bolt 2.26 to the heat sink 2.20 and from there through the thyristor or diode 2.22 to the second heat sink 2.21 with plug pin 2.28, which is also provided with an insulating tube 2.29.

Four apertures 2.33 are also provided on the floor 2.31 of the insulating box 2.30. The plug pins extend through two of the said bores and are guided by means of resilient sleeves 2.34. The space 2.35 between the wall 2.31 and the heat sink 2.21 is provided for accommodating non-inductive circuit resistors. The remaining circuit means, such as pulse transformer, capacitor and fuse monitoring means, not shown in the drawing, are accommodated in the space 2.37 formed by the walls 2.36 of the insulating box 2.30. The control current plug strip 2.38 for the control conductors is also installed at that position.

The double module illustrated in FIG. 13 comprises two individual modules with minor modifications. The module disposed at the front on the right-hand side of the illustration contains extended plug pins 2.23' and 2.28'. Furthermore, its control conductors are looped through plug connections 2.38', 2.39' on to the plug strip 2.38, disposed in the rear module. The modules are mechanically joined by screw fastening means of the two frontal plug pins 2.23' and 2.28'.

I claim:

1. A mounting frame for a static converter system comprising an assembly of stacked and interconnected cells each of which receives a converter module of the plug-in type, each said cell having a rectangular configuration and including parallel spaced side walls, top and bottom walls and a rear wall, said side walls including parallel spaced externally located ribs provided with through-bores and which extend for a maximum of one-half the height of the side walls, the ribs on one side wall extending from the top down and the ribs on the opposite side wall extending from the bottom up, laterally adjacent cells being located in side-by-side relation with the lower ribs of one cell in alignment with the upper ribs of the adjacent cell, fastening bolts extending through the aligned bores of laterally adjacent cells for securing said cells in the side-by-side relationship, and connection terminal means carried by the rear wall of each cell and which are engaged with the plug-in terminals on the converter modules.

2. A mounting frame as defined in claim 1 wherein said ribs extend from the top or bottom as the case may be to the middle of the side wall.

3. A mounting frame as defined in claim 1 wherein said cells are stacked in superposed as well as in side-by-side relation and wherein said bolts provide a continuous fastening connection which extends through all of the superposed cells.

4. A mounting frame as defined in claim 3 wherein said bolts have a length substantially equal to the height of the cell, the upper end of one bolt being screw-connected to the lower end of an adjacent bolt.

5. A mounting frame as defined in claim 4 wherein the screw connection between the ends of adjacent bolts includes a non-circular nut accommodated in a like non-circular recess provided at the end of the rib.

6. A mounting frame as defined in claim 1 wherein said cells are stacked in superposed as well as in side-by-side relation and wherein the top and bottom walls of each cell are provided with openings which establish a vertically extending air flow path through the stack of superposed cells for cooling the converter modules.

7. A mounting frame as defined in claim 1 wherein said cells are stacked in superposed as well as in side-by-side relation and wherein vertically extending spaces created intermediate the side walls of laterally adjacent cells by the ribs thereon provide a vertically extending air flow path through the stack of superposed cells for cooling the converter modules.

8. A mounting frame as defined in claim 1 wherein said cells are stacked in superposed as well as in side-by-side relation, wherein the top and bottom walls of each cell are provided with openings which establish a vertical air flow path through each cell for cooling the converter module therein and a transverse barrier and air deflector means located in a spacer element placed between the top wall of one cell and the bottom wall of the adjacent cell, said barrier serving to divert the air flow after reaching the upper end of one cell outwardly into the space established externally of the side wall of the next cell by the ribs thereon and thence back into the interior of the next cell for flow through the latter.

* * * * *